UNITED STATES PATENT OFFICE.

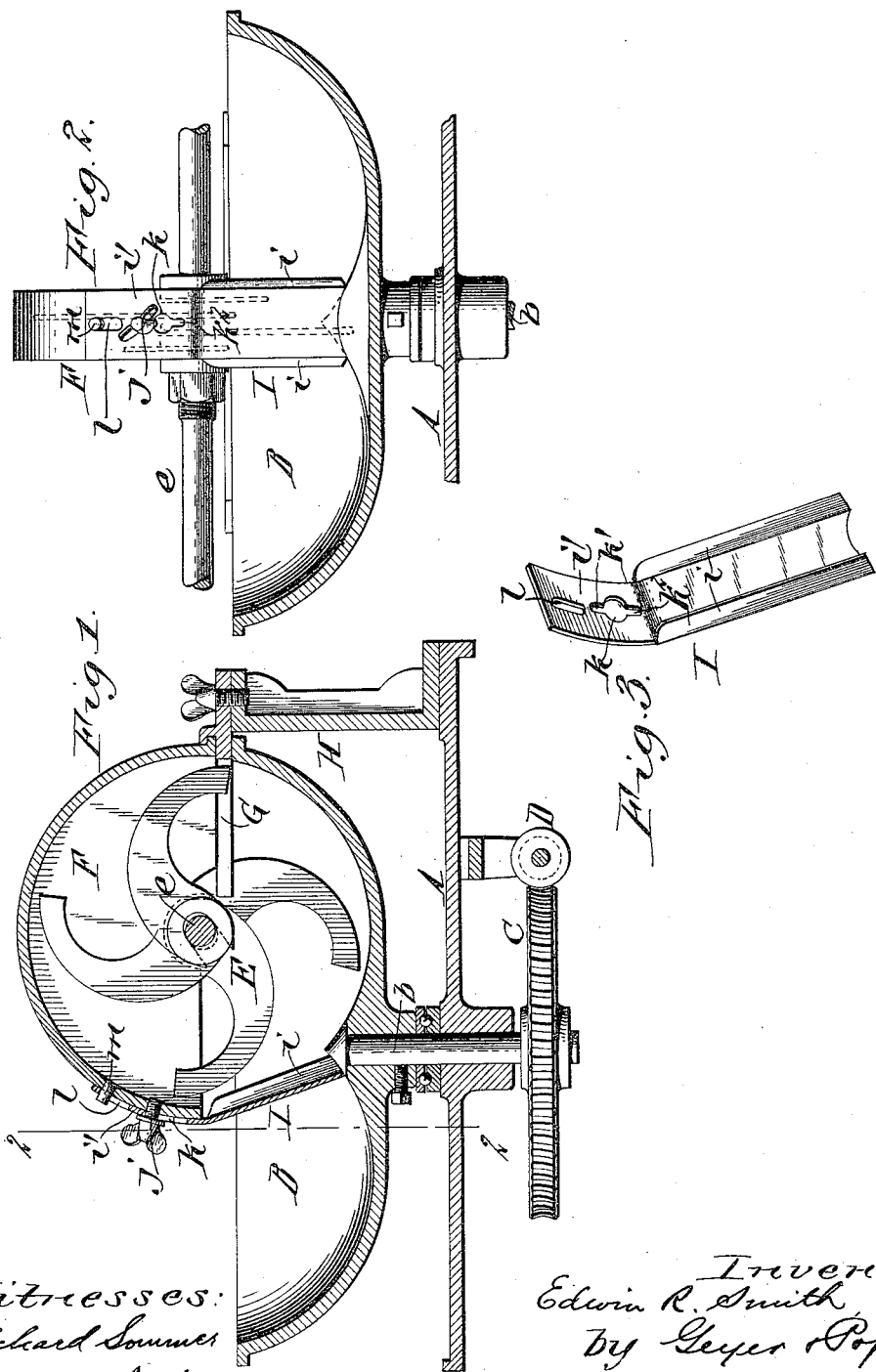

EDWIN R. SMITH, OF BUFFALO, NEW YORK.

MEAT-CUTTING MACHINE.

1,069,485. Specification of Letters Patent. Patented Aug. 5, 1913.

Application filed July 2, 1910. Serial No. 570,080.

*To all whom it may concern:*

Be it known that I, EDWIN R. SMITH, a citizen of the United States, residing at Buffalo, in the county of Erie and State of New York, have invented new and useful Improvements in Meat-Cutting Machines, of which the following is a specification.

This invention relates to meat cutting machines comprising a rotary horizontal bowl, rotary knives or cutters mounted on a shaft extending across the top of the bowl, and a hood overhanging the bowl and inclosing the knives. In machines of this class which have no mechanical means for stirring the meat in the bowl, it is necessary to stir it by hand, in order to uniformly cut all portions of the meat. This necessitates placing the hands in the front portion of the bowl not only for stirring the meat but also for removing it, which is done while the machine is in operation so as to carry all of the meat to the front of the machine within the operator's reach. In machines as heretofore constructed, the space between the lower front portion of the hood and the bottom of the bowl is open, exposing the knives at that point and leaving the operator's hands unprotected and liable to be carried under the knives by the rotary movement of the bowl. As the knives travel at a speed of from 1500 to 1700 revolutions per minute, the danger of such a construction is evident.

The principal object of my invention is to provide the machine with a simple guard which will effectually protect the operator's hands.

A further object is the provision of simple means for removably attaching the guard to the hood, so that it can be readily removed for conveniently cleaning the bowl.

In the accompanying drawings: Figure 1 is a vertical section of a meat cutting machine embodying the improvement. Fig. 2 is a similar section at right angles to Fig. 1, its plane being on the line 2—2, Fig. 1. Fig. 3 is a perspective view of the guard.

Similar letters of reference indicate corresponding parts throughout the several views.

A indicates the bed plate of the machine which may be mounted on legs or other suitable supports not shown in the drawings.

B indicates the rotary bowl mounted on the usual upright shaft $b$ which may be driven by a worm wheel C and a worm D or by any other suitable means.

E indicates the customary rotary cutters or knives mounted on the transverse shaft $e$, and F the usual semi-circular hood which overhangs the bowl and incloses the knives while passing through the upper half of their rotation. This hood is attached to the comb-plate G which in turn is mounted upon the usual standard H rising from the bed-plate A.

I indicates the improved guard which extends downwardly from the lower front end of the hood F to or nearly to the bottom of the bowl, so as to stand in front of the knives as they sweep through the bowl and protect the operator from injury while stirring the meat in the front portion of the bowl with his hands. This guard preferably consists of a plate of suitable width to cover the knives provided at its lateral edges with inwardly-extending flanges or wings $i$ which aid in protecting the operator's hands and also serve to stiffen the guard. The guard is removably attached to the hood by any suitable means, to facilitate cleaning of the bowl. For this purpose, the guard is preferably provided at its upper end with a shank $i^1$ curved to conform to the front side of the hood and provided with a longitudinal slot adapted to receive the stem of a thumb screw $j$ which engages a screw threaded opening in the hood. Said slot has a central enlargement $k$ of the proper size to pass over the head of the screw $j$ and contracted portions $k^1$, $k^2$ adapted to pass over the wings of the screw. The shank of the guard is provided with a second longitudinal slot $l$ which receives a pin $m$ projecting from the front side of the hood. This pin prevents turning or lateral displacement of the guard on the hood.

In applying the guard to the hood, the slots of its shank are passed over the thumb screw $j$ and the pin $m$ and the guard is then shifted downward to bring the contracted upper portion $k^1$ of the main slot under the head of the screw, after which the latter is tightened, as shown in Figs. 1 and 2. To remove the guard, the screw is loosened and the guard is shifted upward sufficiently to bring the enlargement $k$ of the main slot into register with the head of the screw.

The guard is preferably inclined toward the knives, as shown in the drawings, so that its lower portion extends rearwardly beyond the front end of the hood, thus leaving more room for the operator's hands. It is to be noted that when at the bottom of the bowl the knives extend to the center thereof, but when at a level with its top they extend some distance beyond its vertical center-line. It has been found in practice that in view of the fact that the operator in stirring or removing the meat can safely place his hands closely to the center of the bowl-bottom he is apt to forget that he cannot raise them vertically at that point without being injured by the cutters. After placing his hands near the center of the bowl to gather all of the meat for stirring it, he is therefore liable to be injured unless he withdraws them first forwardly and then upwardly. In order to effectually protect the hands and at the same time leave a comparatively large space in the front portion of the bowl for stirring the meat, the guard is extended downwardly and inwardly in an inclined position toward the center of the bowl, as above described.

This improved guard, while involving but a nominal cost, adds greatly to the safety of the operator and enables him to thoroughly stir the meat without danger of being injured by the knives.

I claim as my invention:

In a meat cutting machine, the combination of a rotary bowl, rotary cutters arranged therein, a hood supported above the bowl and inclosing the cutters while passing through the upper arc of their path, said hood extending forwardly beyond the center of the bowl, and a rearwardly-inclined guard arranged in the bowl in front of the cutters, said guard being attached to the front portion of the hood and its lower end extending to the bottom of the bowl adjacent to the center thereof.

Witness my hand this 28th day of June, 1910.

EDWIN R. SMITH.

Witnesses:
C. F. GEYER,
ANNA HEIGIS.

---

Copies of this patent may be obtained for five cents each, by addressing the "Commissioner of Patents, Washington, D. C."